United States Patent [19]
Garbi et al.

[11] Patent Number: 5,218,194
[45] Date of Patent: Jun. 8, 1993

[54] ADVANCED HIGH VOLTAGE POWER SUPPLY FOR NIGHT VISION IMAGE INTENSIFER

[75] Inventors: Michael Garbi, Dallas; Edward J. Fuhr, Plano, both of Tex.

[73] Assignee: Varo Inc., Garland, Tex.

[21] Appl. No.: 746,852

[22] Filed: Aug. 19, 1991

[51] Int. Cl.$^5$ ............................................. H01J 40/14
[52] U.S. Cl. ......................... 250/214 VT; 250/214 C
[58] Field of Search ................ 250/213 VT, 214 AG, 250/207, 214 C; 313/528, 529, 532

[56] References Cited

U.S. PATENT DOCUMENTS

| | | |
|---|---|---|
| 3,666,957 | 5/1972 | Wyess . |
| 3,739,178 | 6/1973 | Chow . |
| 3,816,744 | 6/1974 | Chow . |
| 3,864,595 | 2/1975 | Lawrence et al. . |
| 3,872,302 | 3/1975 | Fender . |
| 3,976,874 | 8/1976 | Lange et al. . |
| 4,025,955 | 5/1977 | Grallien et al. . |
| 4,037,132 | 7/1977 | Hoover . |
| 4,044,249 | 8/1977 | Moore, Jr. et al. . |
| 4,139,798 | 2/1979 | Hoover . |
| 4,166,213 | 8/1979 | Hoover . |
| 4,195,222 | 3/1980 | Fouilloy . |
| 4,412,128 | 10/1983 | McDonald . |
| 4,433,236 | 2/1984 | Shimada . |
| 4,625,106 | 11/1986 | Bender et al. . |
| 4,839,569 | 6/1989 | Dallin, II . |
| 4,924,080 | 5/1990 | Caserta et al. . |

Primary Examiner—David C. Nelms
Assistant Examiner—Michael Messinger
Attorney, Agent, or Firm—Baker & Botts

[57] ABSTRACT

The improved power supply of the present invention adjusts the voltages applied to an image tube to provide automatic brightness control and automatically compensate for temperature changes. A first oscillator, transformer and multiplier supply DC high voltage to a microchannel plate (MCP) electron multiplier of an image tube. The oscillator is controlled via control circuitry to modify the voltage applied to the MCP to automatically compensate for temperature changes associated with an image tube and to provide an automatic brightness control mode of operation. A second oscillator, transformer and individual multipliers are used to supply appropriate DC voltages to the cathode and screen of an image tube; these voltages are also automatically adjusted for temperature changes associated with the image tube. The screen current is detected and is used by additional control circuitry as feedback for the first oscillator to provide the automatic brightness control mode of operation. The power supply may separately adjust the operational voltage supplied to the MCP and the screen current needed to activate the automatic brightness control mode of operation.

19 Claims, 2 Drawing Sheets

ADVANCED HIGH VOLTAGE POWER SUPPLY FOR NIGHT VISION IMAGE INTENSIFER

BACKGROUND OF THE INVENTION

This invention relates to power supplies for image tubes, and more particularly, relates to power supplies for image tubes which utilize microchannel plate (MCP) electron multipliers.

Image intensifier tubes are used to help an observer see objects under light conditions which would normally preclude vision, i.e., in night vision systems. In general, image intensifier tubes use some type of photocathode upon which the incident light is focussed to generate electrons. These electrons are then accelerated and cascaded by various means and impact a phosphorus screen which via a lens depicts the resulting intensified image. Depending upon the amount of voltage applied to the electrons and the amount of electron cascading (or amplification) the intensity of a single incident photon is increased significantly allowing for vision under very low light conditions. However, to prevent the image on the screen from becoming too bright for human comfort, various circuits have been used to control the brightness or gain of the intensifier tube.

However, it is difficult to have a power supply for an image intensifier that includes these features in an economical and reliable circuit. In addition, it is desirable that the voltages applied to various portions of the image intensifier tube be adjustable to provide for adjustments in the onset of the automatic brightness control. Further, it is desirable to include as many of the circuit elements as possible associated with such a power supply in a single integrated chip. The power supply of the present invention fulfills all these unmet needs.

These and other limitations and disadvantages of the prior art are overcome by the present invention, however, and an improved power supply is provided for an image intensifier tube.

SUMMARY OF THE INVENTION

In a preferred embodiment of the present invention, an improved power supply for image intensifier tubes employing a microchannel plate (MCP) electron multiplier is provided. The improved power supply of the present invention detects screen current to detect changes in the tube's output illumination representative of changes in input illumination and provides this as a signal to control circuitry which adjusts the high voltage supply for the MCP to provide for an automatic brightness control (ABC) mode. In this manner the screen current is sensed as a measure of input illumination and used to provide the automatic brightness control (ABC) mode of operation via adjustments to the voltage supplied to the MCP. The high voltage supply to the MCP is normally (non-ABC mode) regulated by other control circuitry at some adjustable normal operating voltage with automatic voltage changes made for temperature variations. Control circuitry also regulates the DC voltages supplied to the screen and cathode of an image intensifier tube. Further, the power supply has appropriate adjustments to allow for independent adjustment of the onset of the ABC mode and the normal MCP operating voltage. A temperature programmed reference voltage supplies a reference voltage to the control circuitry to provide improved temperature stability. In addition, the circuit elements associated with the control circuitry and portions of the high voltage supplies are selected to be simple in nature so that they may be included in a single integrated chip.

The power supply of the present invention may be combined with an appropriate image intensifier tube, a source of DC power, and other components to create a night vision system.

It is an object of the present invention to provide an improved high voltage power supply for an image intensifier tube using a microchannel plate electron multiplier.

These and other objects and features of the present invention will become apparent from the following detailed description, wherein references are made to the figures in the accompanying drawings.

IN THE DRAWINGS

DETAILED DESCRIPTION

Figure 1:
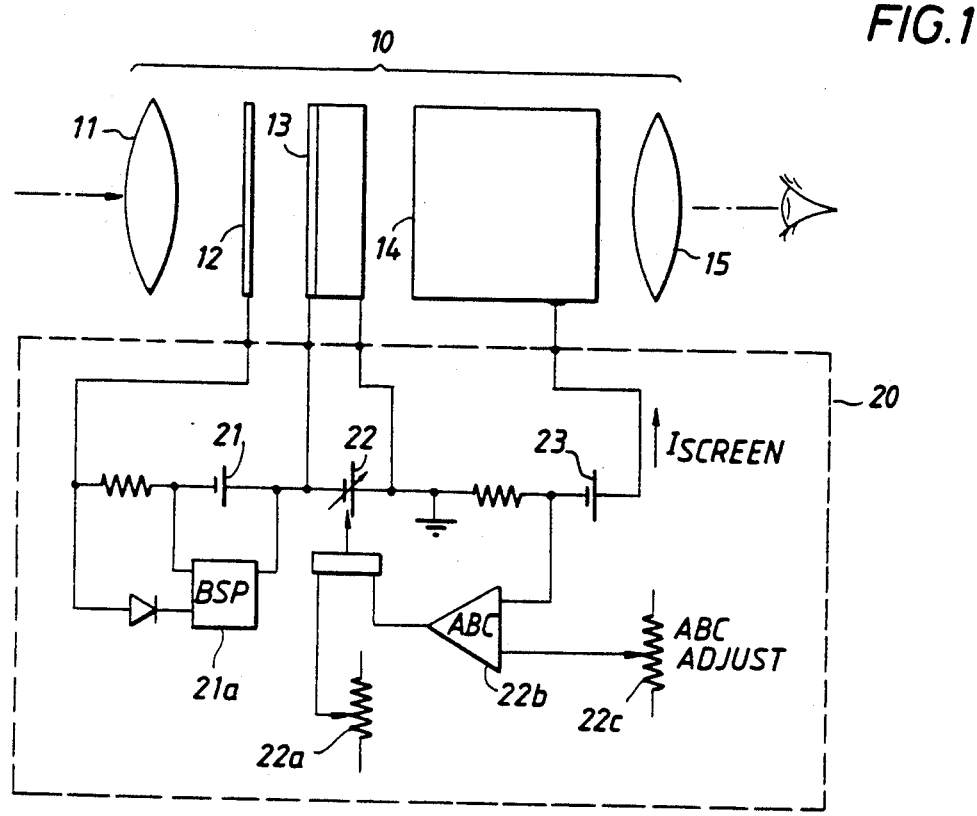
FIG. 1 is a simplified block diagram of a power supply for an image tube.

Referring now to FIG. 1, there may be seen a simplified block diagram of a power supply 20 connected to an image tube 10. More particularly, there may be seen an image intensifier tube and its associated high voltage power supply. The image intensifier tube 10 consists of a lens 11 which focuses the incoming light onto a photocathode 12. The photocathode 12 emits electrons (not shown) in response to incident light; these electrons are then accelerated and multiplied by a microchannel plate (MCP) electron multiplier 13. The electrons (not shown) from the MCP 13 then strike a phosphorus screen 14 whose resulting light is focused by a lens 15 into the eye of a human user.

Continuing to refer to FIG. 1, a power supply 20 consists of various high voltage power supplies and associated control circuitry. More particularly, it may be seen that the photocathode 12 has a high voltage power supply 21, which has a bright source protection (BSP) element 21a. The microchannel plate (MCP) electron multiplier 13 also has its own associated high voltage power supply 22 whose voltage may be adjusted 22a to compensate for manufacturing differences in image intensifier tubes. In addition, the high voltage power supply 22 automatically provides an automatic brightness control (ABC) 22b mode of operation for the tube, which may be adjusted 22c to compensate for manufacturing differences in tubes. Thus, this high voltage power supply 22 is independently and manually adjustable to fix the voltage at the MCP and the onset of the ABC mode depending upon the manufactured characteristics of the MCP and image tube. The screen 14 also has its own separate high voltage power supply 23. The screen current, $I_{screen}$, is detected by an appropriate circuit element (not shown) and is used as a measure of when it is appropriate to shift the image intensifier tube from its normal low light level linear operation into an automatic brightness control mode of operation. The improved power supply is powered by a 2-3 volt DC battery (not shown).

Figure 2:
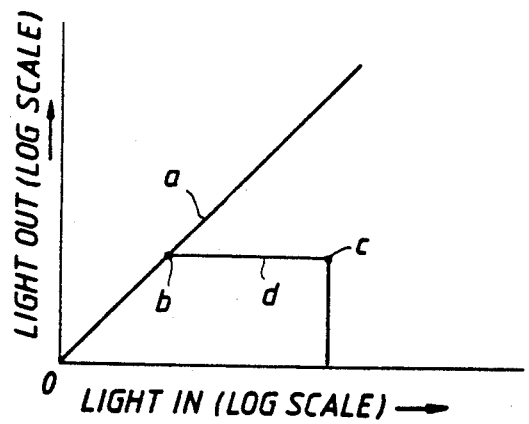
FIG. 2 is a graphic depiction of the intensity of light in versus the intensity of light out for a typical image intensifier tube.

In general, an image intensifier tube is designed to amplify very low to low levels of incident light into levels comfortably seen by the human eye over a wide range of incident light intensities. For very low light levels the amplification is such that, although not visibly seen by the human eye before amplification, after amplification the object is easily visible. Thus, FIG. 2 depicts, generally, the operation of an image intensifier tube to increase on a linear basis the amount of light out in proportion to the amount of light received. That is, the light out axis represents the intensity of light at the viewing portion of the intensifier tube and the light in axis represents the intensity of light being received by the image intensifier tube. The straight line a of FIG. 2 depicts the result of no output light brightness control, i.e., when the light out increases in direct proportion to the light in, regardless of the intensity of light received. With no brightness control the light out would at some point become too bright for the comfort of the human eye.

In order to prevent this, at a first point b, the intensity of the light out should decrease as the intensity of the light in continues to increase. At a second point c, the intensity of the light out should drop off rapidly and eventually reach zero even as the intensity of the light in continues to increase. The line d parallel to the "light in" axis of FIG. 2 depicts the preferred gain control response for an image intensifier tube containing a microchannel plate. All of these modes of operation should occur independently of the temperature of the tube and the voltage level of the power supply. The power supply of the present invention automatically provides for most of these desired features (voltage regulation, temperature compensation, linear low intensity amplification, and automatic brightness control), as well as providing for separate adjustment of the MCP normal operating voltage and the onset of the ABC mode.

Figure 3:
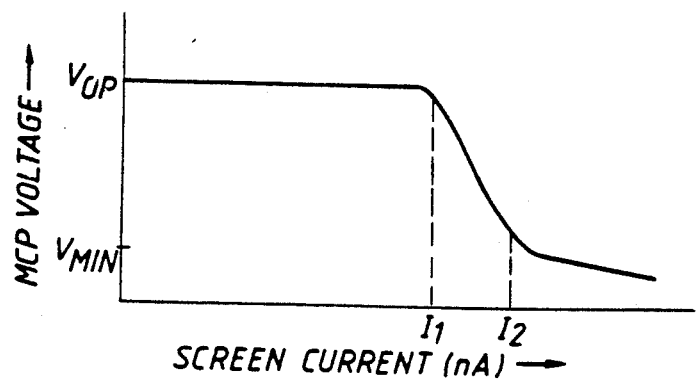
FIG. 3 is a simplified graphic representation of the voltage applied to an MCP associated with an image intensifier tube versus the screen current of the image tube.

Referring now to FIG. 3 there may be seen a simplified graphic representation of the voltage applied to an MCP versus screen current to achieve the foregoing automatic brightness control mode of operation of an image intensifier tube. More particularly, it may be seen that the voltage that is applied to the MCP versus screen current is fixed at some normal operating voltage $V_{op}$ until the screen current reaches some first threshold $I_1$. $V_{op}$ should be adjustable to allow for manufacturing variations in image tubes. This flat portion of the MCP voltage curve corresponds to the proportional increase in light out versus light in depicted in FIG. 2 as curve a. However, once the screen current reaches some predetermined minimum $I_1$ then the image intensifier tube is shifted to an automatic brightness control mode of operation which corresponds to the decrease in the MCP voltage between the two dashed lines. This mode corresponds to the flat line d paralleling the light in axis portion of FIG. 2. However, if the intensity of the light continues to increase as reflected by the screen current beyond the second dashed line $I_2$ then the MCP voltage may be reduced even more and results in the further reduction of the MCP voltage to some low fixed level $V_{min}$ which may correspond to a bright source protection mode of operation. This bright source mode of protection may be accomplished by additional circuitry not described herein.

The power supply of the present invention provides an independent adjustment of the normal MCP operating voltage $V_{op}$. This adjustment of MCP voltage effectively allows the entire curve depicted in FIG. 3 to be shifted up and down along the MCP voltage axis of FIG. 3 parallel to the screen current axis. In addition, the power supply of the present invention provides for an independent adjustment of the onset of the automatic brightness control mode of operation, i.e., the value of $I_1$ may be adjusted. This adjustment effectively allows the portion of the curve in FIG. 3 between the dotted lines to move closer to or farther away from the MCP voltage axis.

Figure 4:
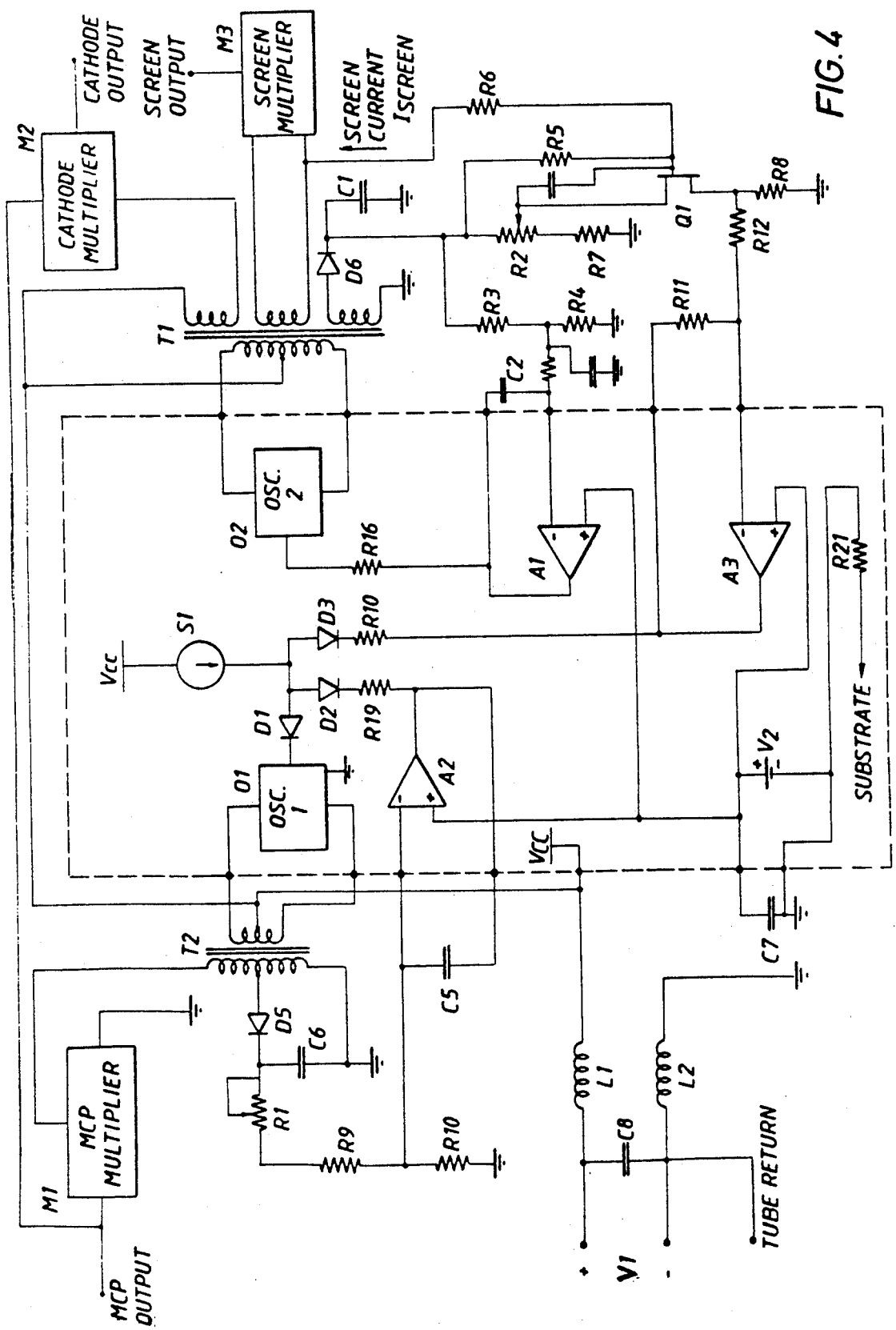
FIG. 4 is a circuit diagram of the improved power supply of the present invention.

Referring now to FIG. 4 there may be seen a circuit diagram of the improved power supply of the present invention. More particularly, it may be seen that the power supply of the present invention includes a first oscillator O1, associated step-up transformer T2, and multiplier M1 for supplying a DC high voltage to the MCP of an image intensifier tube. In addition, it may be seen that there is a second oscillator O2, associated step-up transformer T1, and multipliers M2, M3 for both the cathode and screen of an image intensifier tube. Further, there may be seen various sensor and control circuitry associated with the control of these oscillators to control the operation of the image intensifier tube. The control elements of the circuitry are designed to automatically shift the operation of the image intensifier tube from a low level linear mode into an automatic brightness control mode, while allowing for independent adjustment of the onset of the ABC mode and independent adjustment of the normal MCP operating voltage.

Oscillator O2 provides a fixed regulated voltage for use by the screen and cathode. In a normal mode of operation oscillator O1 provides an adjustable regulated voltage for use by the MCP, but in an ABC mode of operation oscillator O1 provides a voltage dependent upon measured screen current. Oscillator O1 is automatically shifted to the ABC mode by control circuitry when the control circuitry measures screen current at or above some adjustable threshold current level. In addition, the power supply also includes an automatic adjustment of voltages supplied to the components of an image intensifier tube for temperature changes associated with the image intensifier tube.

That portion of FIG. 4 which is outlined in the dashed line is preferably included in a single integrated chip. The detailed operation of the various elements of the chip in combination with the other circuit elements will now be described.

The current supplied to oscillator O1 by current source S1 determines the amount of DC voltage that is applied to the MCP through its associated transformer T2 and MCP multiplier M1. The current supplied to oscillator O1 may be adjusted via a diode D2, resistor R19, and operational amplifier A2 to provide a fixed but adjustable MCP normal operating voltage for a low level linear illumination mode of operation. An additional diode D3, resistor R10, and operational amplifier A3 are employed to draw current from current source S1 and reduce the current to oscillator O1 depending upon the amount of sensed screen current to provide an ABC mode.

In a similar manner, second oscillator O2 determines the amount of DC voltage applied to the cathode and screen through its associated transformer T1 and multipliers M2, M3. The current supplied to second oscillator 02 is adjusted by operational amplifier A1 to provide a regulated, constant voltage for the screen and cathode multipliers M3 and M2, respectively.

The transformers T1 and T2 include secondary windings that step up the voltages applied to their primary windings by their respective oscillators. These secondary windings in turn supply these increased voltages to appropriate multipliers. The multipliers in turn further increase the magnitude of the voltage and convert the voltage into a DC voltage for use by the components of an image tube.

In general, the loads on the secondary windings of transformers T1 and T2 are very low and the voltages high, so that any sensing element (resistor) directly in the load circuits would require a very high impedance (to not additionally load the secondaries) and to generate a useful voltage (for load sensing and regulation) and its current would overload the transformers in comparison with their normal small load currents. Thus, separate secondary windings have been provided in T1 and T2 which are used to "sense" or measure the transformer voltages or outputs. Since the secondary outputs are an AC voltage, they are rectified (half-wave) by a diode before they are supplied as control signals or voltages to the operational amplifiers that control the oscillators; the oscillators in turn control the transformer output voltages via the transformer primaries.

A capacitor is connected across each rectifying diode and the "sensing" secondary winding of each transformer to filter the rectified AC signals and produce a DC voltage output which varies in accordance with the AC output on the other secondary winding(s). Thus, the magnitude of the DC voltage across the filter capacitor is related to the voltage applied to the components of the image tube, via their respective multipliers. The DC output voltage generated from the secondary winding is connected to ground through a voltage divider network of resistors. The voltages at junctions of the divider resistors can thus serve as feedback and be used as biasing voltages for the control circuitry (operational amplifiers) and thus establish a predefined voltage at the secondary windings and accordingly at the components of an image tube.

However, the diodes used for rectifying the secondary winding output to "sense" the transformer outputs have a negative temperature coefficient, which causes the control signals (bias voltages) to the operational amplifiers to change as a function of the temperature of the diode (or image intensifier tube). Similarly, the diodes associated with the multipliers have a corresponding temperature coefficient that cause the multiplier output voltages to change as a function of the temperature of the diodes (or image intensifier tube). The temperature effect of diodes is well known (approximately 2 mV/° C.), as a function of its current, and can be appropriately compensated for.

To offset this diode temperature effect, the reference voltage from V2, against which these control signals (or voltages) are compared by the operational amplifiers, is programmed to vary slightly with temperature in the same manner as this temperature variation in the control signal caused by the diodes. Thus, the reference voltage source, V2, is a programmed voltage that also varies with temperature, but in a known and programmed manner to compensate for the control signal and multiplier output temperature variation. This allows the normal mode operational amplifiers (A1, A2) (via the oscillators O1, O2) to maintain a fixed multiplier output voltage, independently of the temperature of an image tube.

Further, the screen current may be detected, and when above an adjustable threshold value, amplified and then used as a control signal for a third operational amplifier A3, which varies the MCP voltage (via oscillator O1) to provide the automatic brightness control mode of operation for an image tube. In particular, transistor Q1 is used to convert the detected screen current from values in the nanoampers range to values in microampers range and thus allow for control of operational amplifier A3.

Continuing to refer to FIG. 4, it may be seen that oscillator O1 is a current-controlled oscillator that typically runs from about 20 to about 50 KHz. That is, this is a typical oscillator whose output voltage is in direct proportion to its input current. The output AC voltage of oscillator O1 is applied to the primary of transformer T2. The secondary of transformer T2 has one winding that supplies a high AC voltage to the MCP multiplier M3. A second winding (via a tap) is used to "sense" the output of the transformer. This second winding is connected to diode D5 which rectifies (half-wave) the AC output of the second winding and C6 which filters this DC output. There is also an adjustable resistor R1 in series with D5 which is used to adjust the MCP normal operating voltage. Also in series with R1 is a voltage divider network, consisting of resistors R9 and R10, which divide a portion of this rectified output voltage. Thus, part of the voltage (from the "sensing" secondary) across the voltage divider is applied as one input to operational amplifier A2.

Operational amplifier A2 compares the voltage from this voltage divider with a reference voltage which comes from the voltage reference source V2. The operational amplifier A2 draws current from the current source S1 via diode D2 and resistor R19 to adjust the amount of current supplied to oscillator O1, and thereby the output of transformer T2; the output of transformer T2 generates the sensing voltage that is being compared by operational amplifier A2. As the sense voltage rises, A2 draws more current from the current source so that oscillator O1's current input decreases and thus reduces O1's output voltage and accordingly the MCP voltage; thus, the MCP voltage is regulated. In this manner, the operational amplifier A2 is used to fix the MCP voltage at some preselected but adjustable (via R1) normal operating voltage level.

However, as noted herein above, this voltage level may be adjusted by adjusting R1 to modify the amount of voltage sensed by operational amplifier A2 as part of the output of transformer T2. In general, resistor R1 should have a sufficient range to allow the output voltage from the MCP multiplier M1 to range from between about negative 400 volts to about negative 1,000 volts. A typical value for the MCP voltage would be about negative 825 volts DC.

Continuing to refer to FIG. 4, there may be also seen a DC voltage source V1 which is used to provide power for this power supply. V1 may be a 2 to 3 volts DC battery. Coils L1 and L2, along with capacitor C8, are part of the circuitry that are used as an electromagnetic interference filter. The DC power source V1 provides the voltage which allows for the current source S1 to provide current to oscillator O1 and provides the DC power to operate the remainder of power supply circuitry.

There may be also seen an oscillator O2 which generates a fixed DC voltage for the cathode and screen of an image tube. Oscillator O2 is again an oscillator whose output voltage is determined by its input current. It may be seen that the output AC voltage of oscillator O2 is connected to the primary of transformer T1. There are three individual secondary windings associated with transformer T1. One secondary winding provides a high voltage AC to the cathode multiplier M2; the cathode multiplier M2 provides a high voltage DC to the cathode. A second secondary winding provides a high voltage AC to the screen multiplier M3, which in turn supplies high voltage DC to the screen. There is also a third secondary winding which is used to "sense" the output of the transformer T1. Alternatively, several taps may be used with one secondary winding.

As with transformer T2, this output voltage is an AC voltage and, accordingly, must be rectified before it can be used in any feedback circuitry to control oscillator O2. Accordingly, diode D6 and capacitor C1 are used to rectify and filter the AC output, which is again series connected to a voltage divider network of resistors R3 and R4; again, a portion of the rectified output voltage is used as one of the control inputs for an operational amplifier A1. The other control voltage for operational amplifier A1 is the reference voltage from the reference voltage source V2. Operational amplifier A1 provides the current necessary to drive oscillator O2 to provide the output voltages for the cathode and screen. It may be seen that operational amplifier A1 is operated in an inverted negative feedback manner to compensate for load variations in the secondary of transformer T1 and power supply voltage fluctuations or variations. In this manner the voltages that are applied to the cathode and screen are regulated at some preselected values, regardless of power supply and load variations; further, these values are automatically compensated for temperature variations, as noted before.

There may be also seen resistor R6, which is part of the screen circuitry and is the resistive element that is used to detect the screen current. However, because the screen voltage is usually a very high positive voltage, typically of the order of 6,000 volts DC, and the fact that the image tube operates at very low power, the resulting screen current is negative and very low. The screen current usually varies from approximately 0 to about 150 nanoamps. Transistor Q1 is a P-channel JFET, and is normally not conducting but is turned on to shift the MCP into an automatic brightness control (ABC) mode of operation. A JFET is used because its control current may be of the order of picoamps.

The DC voltage necessary to bias transistor Q1 cannot be supplied by a 2-3 volt DC battery but instead is supplied by the voltage from the sensing secondary coil that is rectified by diode D6 and filtered by capacitor C1, and is appropriately reduced through a voltage divider network consisting of resistors R2, R7 and R5. R2 is used to adjust the bias of transistor Q1 to determine when it shifts from an off mode (not conducting) to an on mode (conducting). Resistor R5 is a very high impedance resistor, typically of the order of several tens of megohms, in order to insure that there is a high enough voltage drop across this resistor to bias Q1 in the off or non-conductive mode until the screen current reaches a sufficiently high value, above which an ABC mode is to control tube operation.

Once Q1 begins to conduct, then the screen current adds to any gate current from the bias voltages and controls the amount of drain current through Q1 and thus the voltage that is seen by operational amplifier A3 across R8. This voltage is again compared with the reference voltage from reference voltage source V2 and, depending upon the results of this comparison, a variable amount current is drawn through diode D3 and resistor R10 from the current source S1. Thus, operational amplifier A3 draws current from the current source S1, allowing less current to flow through D1 into oscillator O1. In this manner amplifier A3 reduces the output voltage of oscillator O1, and thereby reduces the MCP voltage. Resistor R11 and resistor R12 are included in the circuitry to insure appropriate frequency stability of amplifier A3. Q1 may convert an approximately 6 nanoamp current sensed through R6 to approximately 4 microamps through R8, which is sufficient to run operational amplifier A3.

The transformer output sensing diodes D6 and D5 both have a negative temperature coefficient such that the forward voltage drop across these diodes (for a known current) changes slightly with temperature. Depending upon the current, this amount of change is known and can thus be compensated for. This temperature change in turn results in a change in voltages supplied to the operational amplifiers as a function of temperature. Since an image tube and its high voltage power supply may be used in night vision goggles, which are designed to operate over a typical range from $+50°$ C. to $-50°$ C., a large amount of voltage drift can occur because of changes in temperature. Accordingly, the reference voltage V2 is programmed to offset the temperature drift of these two diodes and the diodes of the multipliers, and accordingly the reference voltage that is compared by the operational amplifiers A2 and A3, as well as A1, is offset to reflect these temperature changes. Further, the transistor Q1 has a similar negative temperature coefficient which is offset by the temperature coefficient of the resistor R5, which is selected to specifically help offset the temperature effects of Q1.

Thus, until the screen current reaches some adjustable level, which is determined by resistor R2, the ABC circuitry associated with transistor Q1 and amplifier A3 is inactive. Once the screen current reaches this adjustable preset level, then the ABC circuitry is activated and effectively multiplies or amplifies the screen current to a level sufficient to run operational amplifier A3. Operational amplifier A3 in turn reduces the amount of current available to oscillator O1, and in this manner adjusts the MCP voltage. Thus, the amount of screen current is used to control the MCP voltage, which is the desired ABC mode of operation. As noted before, R2 may be adjusted to adjust the value at which the transistor Q1 begins to operate, that is the threshold screen current that is being sensed and at which the shift to the automatic brightness control mode occurs. It should be noted that once the automatic brightness control mode is entered, operational amplifier A3 takes over control of oscillator O1 from operational amplifier A2. Similarly, once the screen current has fallen to a low enough value where it is no longer necessary to be in the automatic brightness control mode, Q1 ceases conducting, and A3 is no longer operational. When this occurs, operational amplifier A2 again resumes control of oscillator O1. This is accomplished by a logical "and" via diodes D2, D3 and resistors R19, R10.

In general, the current source, the operational amplifiers and the oscillators are standard circuit elements, and the detail circuitry for these elements is not provided herein, as they are generally known to those skilled in the art.

In order to obtain improved temperature stability, the voltage reference feeding the operational amplifiers must be made to vary with temperature so that the temperature effects of the diodes in the multipliers and sense circuitry are compensated. This is particularly true with respect to the MCP voltage output, where the output voltage must be tightly regulated with respect to varying loads over widely ranging temperatures. This is complicated by the fact that no direct sensing of the output voltage is available with this configuration for the MCP output voltage circuitry.

Thus, for temperature stability, the sense circuitry must closely match the temperature induced voltage drift of the MCP output voltage. The percent drift of the MCP output over the desired range of operating temperatures is first determined and then the percent drift of the sensing circuit is adjusted to match that of the MCP output by varying the turns on the sense windings of transformer T2 (and also T1). That is, the current through the rectifying diodes in the sense circuits is adjusted to have this same percent drift. Finally, the percent drift of the sensing circuits is determined, and the reference voltage is designed to have an equal percentage drift in the same direction, thus balancing the MCP and screen outputs.

Since the uncompensated output drift of the MCP output voltage with associated load variations proved to be too large, the MCP sensing circuitry was designed with an identical temperature drift. This was done by adjusting the filtered DC sensing voltage to be approximately 10 volts DC by modifying the turns ratio of T2. Next, the voltage reference was designed for a few percent total drift to match that of the sense circuitry. This is equivalent to roughly a few hundreds of microvolts per degree centigrade drift characteristic. This drift characteristic may be achieved when a reference voltage is run slightly higher than a typical DC silicon band gap voltage, i.e., at about 1.50 volts DC. The circuitry necessary to provide this reference voltage is a modified brokaw configuration which works quite effectively at low bias voltages.

Many other variations and modifications may be made in the apparatus hereinbefore described by those having experience in this technology, without departing from the concepts of the present invention. Accordingly, it should be clearly understood that the apparatus depicted in the accompanying drawings and referred to in the foregoing description are illustrative only and are not intended as limitations on the scope of the invention.

What is claimed is:

1. A power supply for an image tube, comprising
   a first oscillator for providing AC voltage when supplied with DC voltage,
   first voltage multiplier and rectifier circuitry coupled to said first oscillator for providing an increased DC voltage to a first portion of said image tube,
   a second oscillator for providing AC voltage when supplied with DC voltage,
   second voltage multiplier and rectifier circuitry coupled to said second oscillator for providing at least one increased DC voltage to said image tube,
   a current sensing circuit interconnected with said second voltage multiplier and rectifier circuitry for detecting changes in input illumination of said image tube,
   control circuitry interconnected with said current sensing circuit, first oscillator, and first voltage multiplier and rectifier for controlling said increased DC voltage to said first portion of said image tube as a function of input illumination, and
   a temperature compensated voltage reference interconnected with said control circuitry.

2. A power supply as described in claim 1, wherein said control circuitry further comprises, circuitry for adjusting low input illumination gain of said image tube.

3. A power supply as described in claim 1, wherein said control circuitry further comprises, circuitry for shifting operation of said image tube to a non-linear gain as a function of input illumination to said image tube.

4. A power supply as described in claim 2, wherein said control circuitry further comprises, circuitry for, independently of said low input illumination gain adjustment circuitry, shifting operation of said image tube to a non-linear gain as a function of input illumination to said image tube.

5. A power supply as described in claim 1, wherein said control circuitry comprises, a first operational amplifier interconnected with said second oscillator and second voltage multiplier and rectifier for controlling the output of said second oscillator to maintain said at least one increased DC voltage at a selectable voltage.

6. A power supply as described in claim 5, wherein said second voltage multiplier and rectifier circuitry comprises, a first voltage multiplier for increasing the AC voltage from said second oscillator, a first voltage multiplier and rectifier circuit connected to said first voltage multiplier for increasing said increased AC voltage and converting it to a first selectable DC voltage, and a second voltage multiplier and rectifier circuit connected to said first voltage multiplier for increasing said increased AC voltage and converting it to a second selectable DC voltage.

7. A power supply as described in claim 6, wherein said control circuitry comprises, a second operational amplifier interconnected with said first oscillator and first voltage multiplier and rectifier circuitry for controlling the output of said first oscillator to maintain said increased DC voltage at a selectable voltage when said image tube operates in a linear mode, and a third operational amplifier interconnected with said first oscillator, first voltage multiplier and rectifier circuitry, and current sensing circuit for controlling the output of said first oscillator to vary said increased DC voltage as a function of input illumination of said image tube when said image tube operates in a non-linear mode.

8. A power supply as described in claim 7, wherein said first multiplier and rectifier circuitry comprises, a second voltage multiplier for increasing AC voltage from said first oscillator, and a third voltage multiplier and rectifier circuit for increasing said increased AC voltage and converting it to a DC voltage.

9. A power supply as described in claim 8, wherein said temperature compensated voltage reference is interconnected with said first operational amplifier, second operational amplifier, and third operational amplifier.

10. A power supply as described in claim 9, wherein said current sensing circuit is interconnected with one of said first or second voltage multiplier and rectifier circuit.

11. A power supply as described in claim 10, further comprising, a current source for supplying DC current to said first oscillator, and wherein said first oscillator provides an output AC voltage as a function of input DC current.

12. A power supply as described in claim 11, wherein said second operational amplifier and third operational amplifier control the output of said first oscillator by controlling the input current to said first oscillator.

13. A power supply as described in claim 12, further comprising a DC voltage source interconnected with said current source, first voltage multiplier, second voltage multiplier, and one of said first or second voltage multiplier and rectifier circuit.

14. A power supply for an image tube, comprising:
a first DC to AC converter circuit for providing a high voltage AC output from a DC input,
a first multiplier and converter circuit interconnected with said first converter for increasing said high AC output to a higher AC output and converting said higher AC output to a DC voltage for operating an MCP portion of said image tube,
a second DC to AC converter circuit for providing high voltage AC output from a DC input,
a second multiplier and converter circuit interconnected with said second converter for increasing said high voltage AC output to a higher AC output and converting said higher AC output to two DC voltages for operating a cathode and anode portion of said image tube,
a current sensing circuit interconnected with said second multiplier and converter circuit for detecting screen current as a function of input illumination and deriving a control signal representative of said input illumination,
control circuitry interconnected with said first converter and said current sensing circuit for controlling said first converter in response to said control signal and for adjusting said DC voltage for said MCP portion of said image tube responsive to said control signal.

15. A night vision system, comprising:
a source of DC power,
at least one image intensifier tube,
a first oscillator for providing AC voltage when supplied with DC voltage,
first voltage multiplier and rectifier circuitry coupled to said first oscillator for providing an increased DC voltage to a first portion of said image tube,
a second oscillator for providing AC voltage when supplied with DC voltage,
second voltage multiplier and rectifier circuitry coupled to said second oscillator for providing at least one increased DC voltage to said image tube,
a current sensing circuit interconnected with said second voltage multiplier and rectifier circuitry for detecting changes in input illumination of said image tube,
control circuitry interconnected with said current sensing circuit, first oscillator, and first voltage multiplier and rectifier for controlling said increased DC voltage to said first portion of said image tube as a function of input illumination, and
a temperature compensated voltage reference interconnected with said control circuitry.

16. A method for supplying operating power to an image intensifier tube, comprising:
providing a source of DC voltage,
converting said DC voltage to a first higher AC voltage,
multiplying and converting said higher AC voltage to a first higher DC voltage,
detecting screen current of said image tube as a measure of input illumination and generating a control signal representative thereof,
controlling said converting step based upon said control signal to provide for automatic brightness control of said image tube,
independently and fixedly adjusting gain of said image intensifier tube for low light level, and
independently adjusting the onset of automatic brightness control of said image tube.

17. A method as described in claim 16, further comprising,
regulating the controlling step to compensate for temperature changes of said image tube.

18. A method as described in claim 16, further comprising:
converting said DC voltage to a second higher AC voltage,
multiplying and converting said second higher AC voltage to a second and third higher DC voltage.

19. A method as described in claim 18, further comprising,
regulating said multiplying and converting of said second AC voltage to compensate for temperature changes of said image tube.

* * * * *